Figure 1:
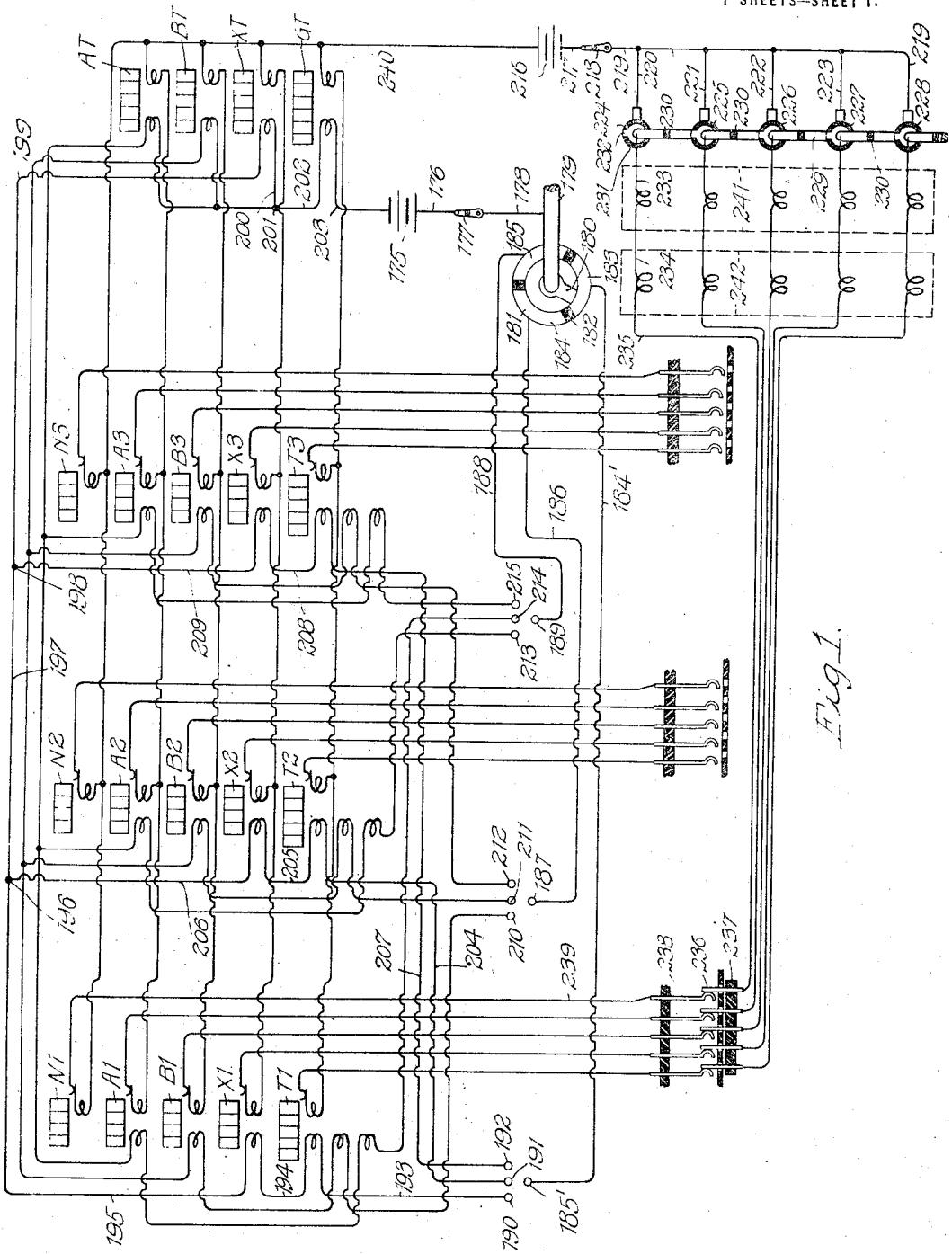

C. H. TALLMADGE.
ACCOUNTING SYSTEM.
APPLICATION FILED MAY 21, 1909.

1,146,113.

Patented July 13, 1915.
7 SHEETS—SHEET 1.

Witnesses
George C. Higham
Leonard W. Novander

Inventor
Charles H. Tallmadge
By
Attorneys

C. H. TALLMADGE.
ACCOUNTING SYSTEM.
APPLICATION FILED MAY 21, 1909.
1,146,113.
Patented July 13, 1915.
7 SHEETS—SHEET 2.
Fig. 2.
Fig. 3.
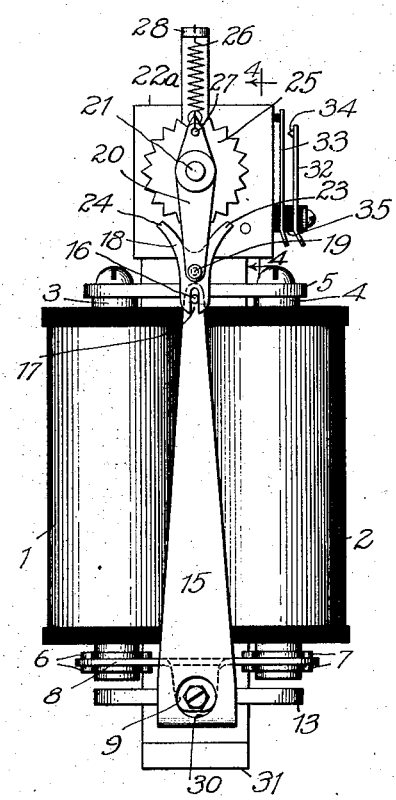
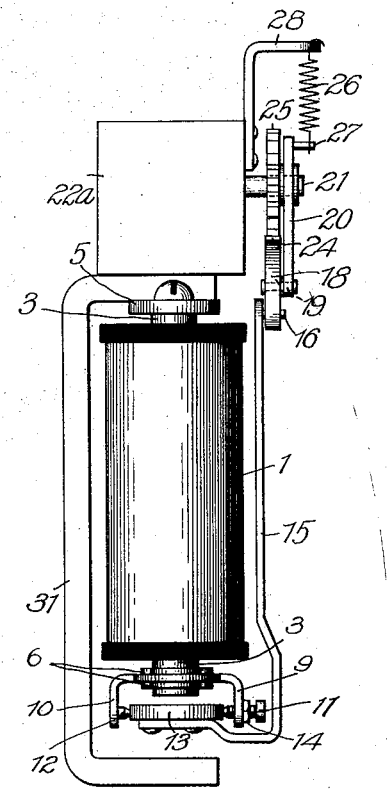
Witnesses:
Leonard W. Novander,
George E. Higham
Inventor
Charles H. Tallmadge
By Browne Williams
Attorneys

C. H. TALLMADGE.
ACCOUNTING SYSTEM.
APPLICATION FILED MAY 21, 1909.

1,146,113.

Patented July 13, 1915.
7 SHEETS—SHEET 3.

Witnesses:
Leonard W. Novander
George C. Higham

Inventor
Charles H. Tallmadge
By Brown Williams
Attorneys

Fig. 10.

UNITED STATES PATENT OFFICE.

CHARLES H. TALLMADGE, OF CHICAGO, ILLINOIS, ASSIGNOR, BY MESNE ASSIGNMENTS, TO WILLIAM R. HEATH, OF BUFFALO, NEW YORK.

ACCOUNTING SYSTEM.

1,146,113. Specification of Letters Patent. Patented July 13, 1915.

Application filed May 21, 1909. Serial No. 497,389.

*To all whom it may concern:*

Be it known that I, CHARLES H. TALLMADGE, a citizen of the United States, residing at Chicago, in the county of Cook and State of Illinois, have invented certain new and useful Improvements in Accounting Systems, of which the following is a full, clear, concise, and exact description, reference being had to the accompanying drawings, forming a part of this specification.

My invention relates to improvements in accounting systems and in particular contemplates improved means for making permanent records of expenses which are incurred in the operation of a factory or other industrial establishment.

In a copending application, Serial Number 437,809, means are disclosed whereby the costs of various jobs in various departments of a factory may be automatically indicated. According to that system, however, it is necessary from time to time to make a manual record of the expenses which are thus indicated, and after the indicating registers have been decumulated or set back to zero there is no way of checking up the records which have been manually made. That involves not only a certain amount of clerical labor but also a liability to inaccuracy and an inherent uncertainty even when the clerical work may be, as a matter of fact, quite accurate.

According to my present invention, when a given job is completed, and the cost thereof accumulated upon suitable indicating registers, it is possible to decumulate the indicating registers automatically and mechanically to transfer the amounts to printing registers. When the indicating registers have been entirely decumulated, means are provided for stopping the decumulating process, the result being that the printing registers are actuated to show exactly the same amount which the indicating registers showed before they were decumulated. When this transfer is completed a permanent record may be made from the printing registers upon the original order sheet; and, if desired, upon another loose leaf, or on a suitable roll of paper, thus preserving a journal of the cost of finished jobs. It is evident that by this method mechanical accuracy is attained and at the same time there is great saving in clerical labor. After a record has been made from the printing registers, they may be manually reset to zero and subsequently connected to the actuating mechanisms for another set of indicating registers and the operation may be repeated. Not only is it provided that the actual expenses shall be transcribed to a permanent record but a register is employed by which an order number may be manually set up, and upon the decumulation of the indicating registers, this order number is simultaneously transferred to the printing registers, and together with the proper date, is subsequently printed on the records. These and other advantages of my invention will be more apparent in the following detailed description in connection with which reference should be made to the accompanying drawings, in which—

Figure 5:
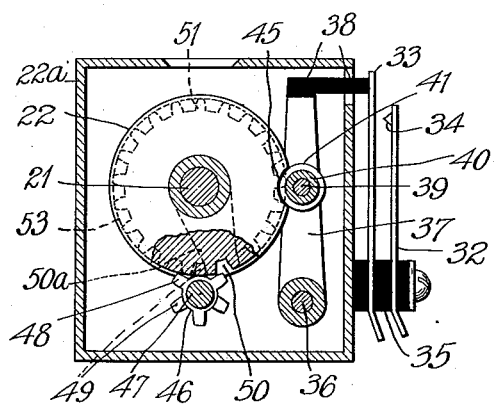
Figure 4:
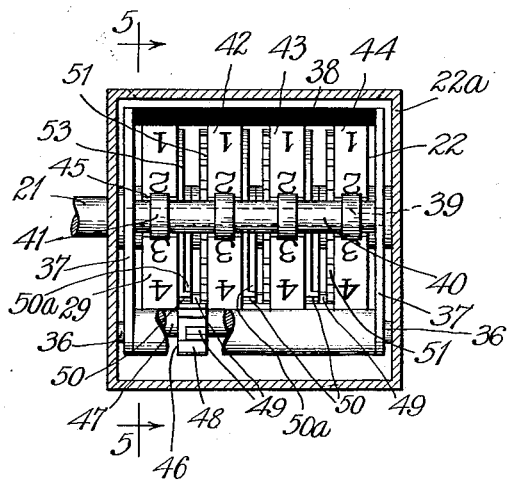
Figure 6:
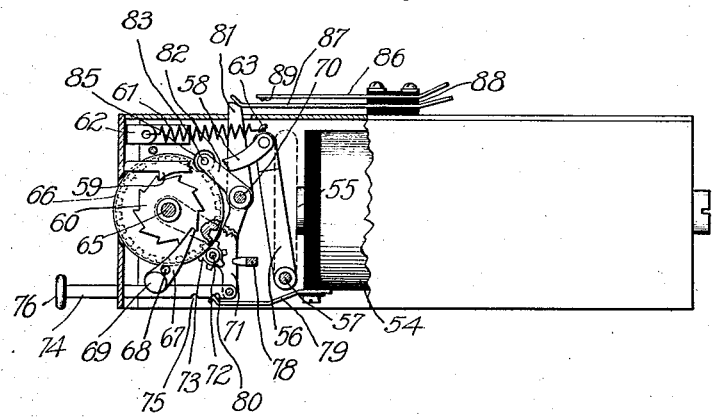
Figure 7:
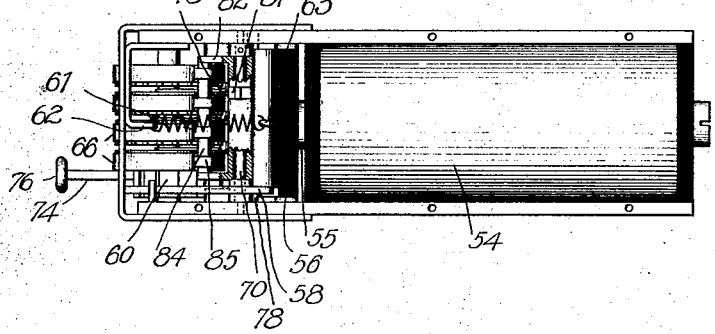
Figure 8:
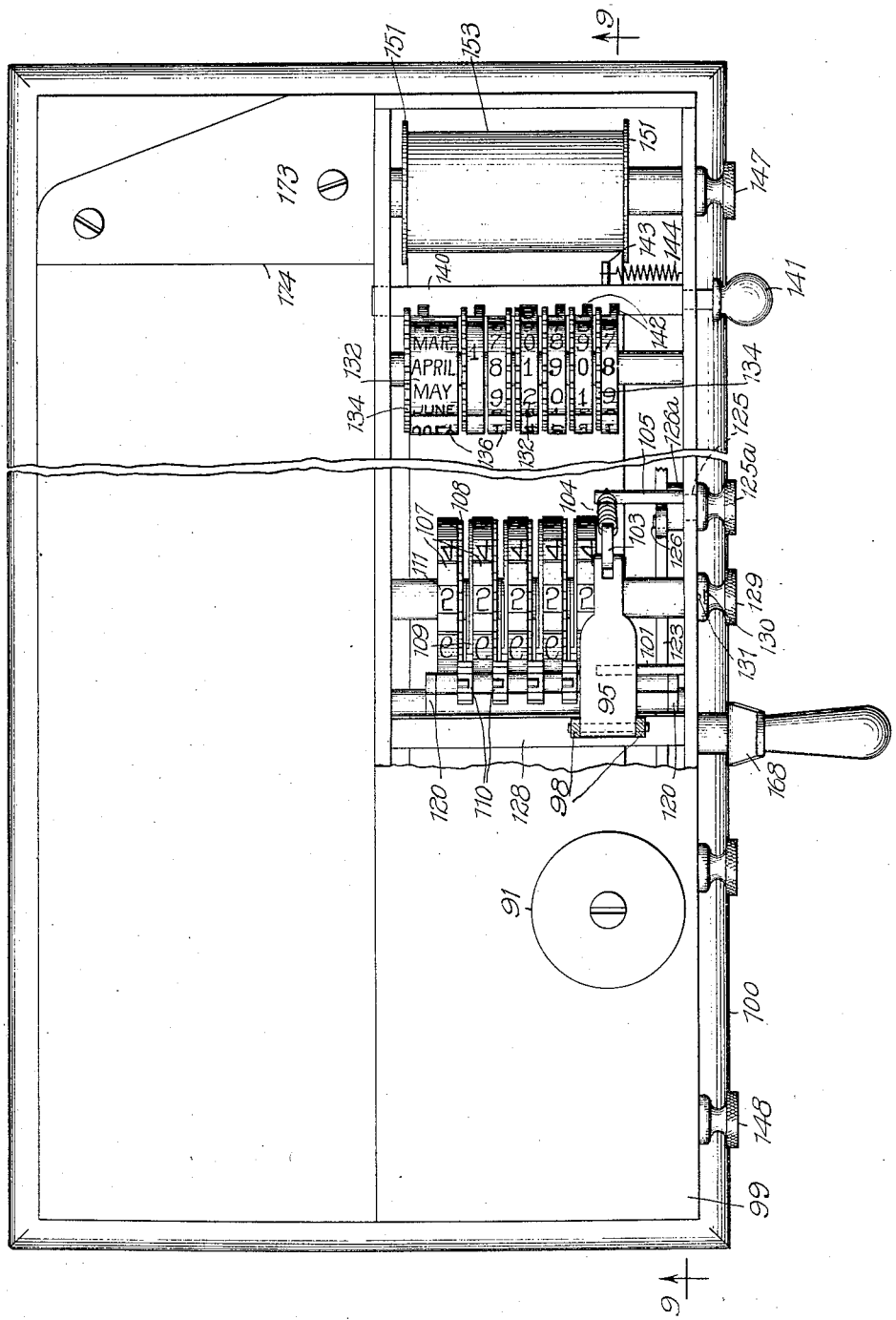
Figure 9:
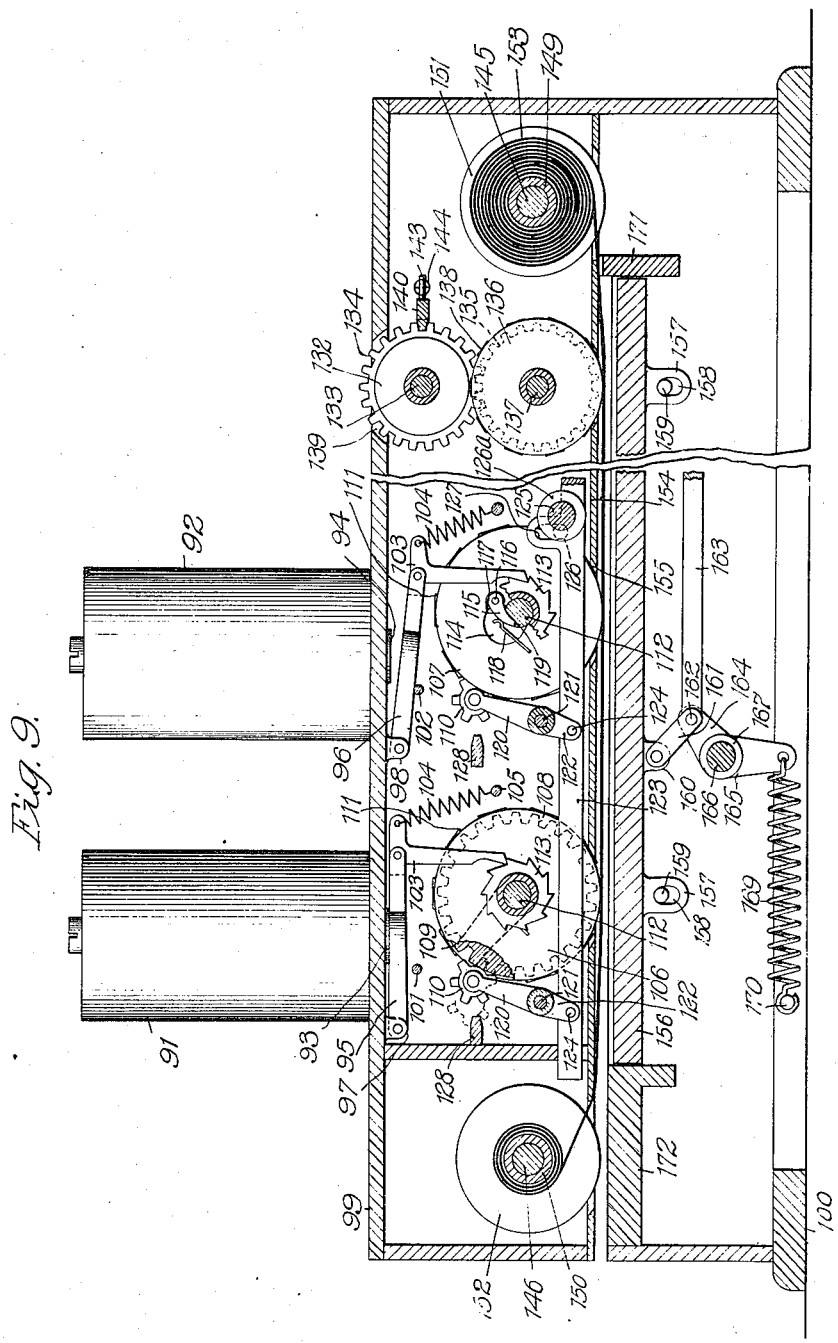
Figure 10:
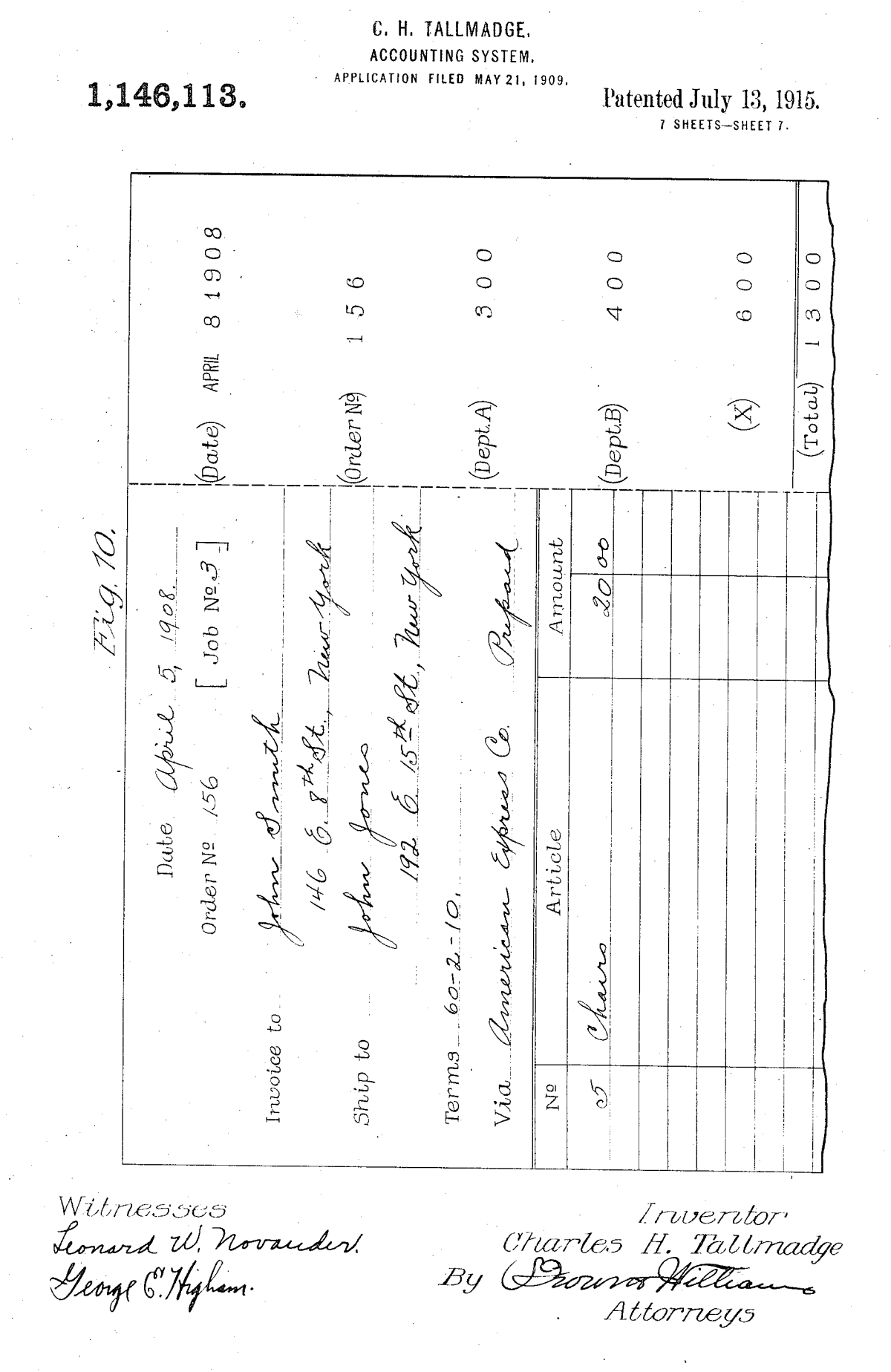

Figure 1 is a diagrammatic representation of the operation of my system as a whole, Fig. 2 is a face view of the electromagnetic actuating mechanism for the indicating registers, Fig. 3 is a side view of the parts shown in Fig. 2, Fig. 4 is an enlarged sectional view on the line 4—4 of Fig. 2, Fig. 5 is a sectional view on the line 5—5 of Fig. 4, Fig. 6 is a side elevation and partly sectional view of the electromagnetic actuating mechanism associated with the order number register, Fig. 7 is a plan view of the mechanism shown in Fig. 6, Fig. 8 is a plan view of the printing registers and associated mechanism, Fig. 9 is a sectional view on the line 9—9 of Fig. 8, and Fig. 10 is an order blank as it would appear after the entries have been made by the printing mechanism.

In order to clearly understand the operation of my system, I will describe first the detailed mechanisms used in connection with them and will then describe the system as a whole.

Figs. 2, 3, 4 and 5 represent various views of an indicating register and the electromagnetic actuating and decumulating mechanism associated therewith. Energizing windigs 1 and 2 of an electromagnet are mounted on cores 3 and 4 which cores are connected at one end by a magnetic yoke 5. The cores 3 and 4 are threaded at their working ends and have secured thereto by means of the adjusting nuts 6 and 7 a nonmagnetic yoke 8, from the middle of which depending ears 9 and 10 are so formed as to support the pivots 11 and 12 used to suspend the armature 13.

The pivot 11 is adjustable as indicated, being held in place by the locking nut 14. The armature 13 has rigidly secured thereto an arm or lever 15 which extends around the ear 9 and upward in front of the windings 1 and 2. At its upper end the arm 15 carries a lug 16. The lug 16 engages a slot 17 in the lower end of a double pawl 18 pivoted at 19 to a lever 20 loosely mounted on the operating shaft 21 of the register 22. The pawl 18 has two upwardly extending arms 23 and 24 adapted to engage the ratchet wheel 25 rigidly secured to the shaft 21. The lever 20 is normally held to its vertical position by the spring 26 secured thereto by means of a pin 27, the other end of this spring being held by a bracket 28 secured to the register 22. As a result of the construction above described when the armature 13 is moved by the energization of the electromagnet in a direction to move the lever 15 to the right the pawl 18 is moved around to the left on its pivot 19. Since the lever 20 is maintained in its normal position by means of the spring 26, when the arm 23 engages the ratchet wheels 25 the pawl 18 and lever 20 are moved together against the action of the spring 26 to turn the ratchet wheel 25 and shaft 21 to advance the indicator wheel 29 one step. The register 22 mounted in the casing 22ᵃ may be of any well known type in which a plurality of indicator wheels is used, each wheel being adapted by its rotation to actuate the wheel of next higher order when such first wheel passes from its maximum indication to its zero indication. If the electromagnet is energized in such manner as to cause the armature 13 to move the lever 15 to the left, the pawl 18 is rotated around to the right on its pivot 19 as a result of which the arm 24 engages the ratchet wheel 25 and the subsequent motion of the lever 15 moves the ratchet wheel 25 and shaft 21 to operate the indicator wheel 29 one step in the opposite direction to that in which it was moved by the operation previously described. It is evident that by this mechanism the register 22 may be operated to either accumulate or decumulate as desired.

The yoke 8 which supports the armature 13 may be moved relatively to the windings 1 and 2 by loosening the nuts 6 and 7 and therefore the amount of motion imparted to the armature 13 and ratchet wheel 25 can be changed as desired, which is necessary in order to secure the proper adjustment of mechanism to change the reading of the register 22 by the correct amount for each motion of the armature 13. A hole 30 is formed in the arm 15 to facilitate adjusting the pivot screw. The character of operation imparted to the armature 13 may be determined by polarizing the armature 13 by means of a permanent magnet 31.

The circuit, in which the electromagnet is included, is provided with a switch having terminals 32 and 33, the terminal 32 being provided with a contact 34. The two terminals are suitably insulated from each other by means of the insulating block 35. In connection with the register 22 is provided a shaft 36 on which is pivoted a frame consisting of the lateral arms 37 and the connecting strip of insulating material 38. Mounted between the arms 37—37 is a rod 39 on which is mounted the sleeve 40 provided at intervals with annular projections 41. The indicating wheels 29, 42, 43 and 44 of the register 22 are provided at suitable intervals with depressions 45. When all of the indicating wheels 29, 42, 43 and 44 are in such position that they all indicate zero, the arms 37 as shown in Fig. 5 will be moved to the left, the annular projections 41 falling into the depressions in the indicating wheels, the terminal 33 being made of suitable spring material so that the arms 37 will be moved toward the left. By this means the terminal 33 is carried away from the contact 34 and the circuit in which the electromagnetic mechanism is included is thereby broken.

The various indicating wheels for the register 22 may be advanced by any of the well known means but the mechanism which I prefer has the following construction: A pinion 46 is loosely mounted on the shaft 47. This pinion has teeth 48 which extend across the entire width of the pinion and alternating with these teeth are teeth 49 which extend partly across the width of the pinion. Each indicating wheel is provided with a cam 50ᵃ having members which form between them a notch 50, the members forming this notch being adapted to pass the teeth 49 but to operate in mesh with the teeth 48. As shown in Fig. 4 the cam 50ᵃ is preferably made to be at the right of each indicating wheel. To the left of each indicating wheel is rigidly mounted a gear 51 which is adapted to operate in mesh with the teeth 48 and 49 of the pinion 46. It is now evident that as indicator wheel 29, for example, is revolved, the notch 50 will engage one of the teeth 48 and the pinion 46 will thereby be rotated a sufficient distance to move the indicating wheel 42 forward one number. As the indicating wheel 29 continues to revolve the portion 53 of the indicating wheel will occupy a position between the left hand end of the tooth 49 and the edge of the pinion 46, the teeth 48 being placed a sufficient distance apart so that they will not interfere with the portion 53 of the indicating wheel. By this means, it is evident, that after the unit indicating wheel has advanced nine numbers, the tenth number will cause a rotation of one number in the wheel indicating tens and correspondingly when this wheel has advanced nine numbers the rotation of the tenth number will advance the wheel indicating hundreds one number.

Turning now to the decumulating mechanism associated with the register for showing the order number as illustrated in Figs. 6 and 7, 54 is an electromagnet having windings about the core 55. Associated with the core 55 is an armature 56 pivoted at 57. Pivoted to the free end of the armature 56 is the arm 58 provided with a tooth 59 adapted to engage corresponding teeth of the ratchet 60. A spring 61 is attached at one end to the bracket 62 and at the other end to the pin 63 mounted on the armature 56. It is evident that the spring 61 serves to keep the armature 56 in a position indicated in full lines in Fig. 6. The ratchet 60 is loosely mounted on the shaft 65 and rigidly connected to the unit indicating wheel of the register 66. The construction of this register is similar to that of the register 22 described above. Associated with the ratchet 60 is a pawl 67 pivoted at 68 and provided with a counter weight 69 which tends to hold the pawl in engagement with the teeth of the ratchet 60. The operation of this electro-magnetic mechanism is now apparent. When the windings of the electromagnet 54 are energized the armature 56 is attracted and moved into the position shown in dotted lines in Fig. 6. The arm 58 is moved to the right and engages with the next tooth of the ratchet 60, this ratchet being held from rotation by means of the pawl 67. When the electromagnet is deenergized the spring 61 becomes effective and the armature 56 and the arm 59 are moved to the left thereby advancing the register. The movement of the arm 59 is restricted by the projecting pin 90.

Pivoted to the shaft 70 is a frame 71 on which is mounted a shaft 72 carrying the pinions 73, these pinions 73 fulfilling the same function with respect to the register 66 as the pinions 46 in the case of the register 22. Pivoted to the lower end of the frame 71 is the rod 74 provided with a notch 75. The rod 74 is provided with a handle 76. It is evident that when the rod 74 is moved to the right as indicated in Fig. 6, the pinions 73 will be disengaged from the gears of the register 66. Lugs 78 are provided which engage the teeth of the pinion 73 and thereby prevent the pinions from rotating when they are disengaged from the register. A spring 79 is rigidly mounted on the frame of the electromagnet 54 and when the rod 74 is moved to the right as shown in Fig. 6, the angular portion 80 of the spring 79 engages the notch 75 of the rod 74 and thereby holds the same against accidental movement.

Loosely mounted on the shaft 70 is the arm 81 to which is rigidly connected the frame 82 carrying the shaft 83 on which is loosely mounted the sleeve 84 having the annular projections 85. Depressions are provided at suitable points in the peripheries of the indicating wheels of the register 66, so that in decumulating, when all of the wheels indicate zero, the annular projections 85 will drop into these depressions thereby moving the arm 81 to the left as shown in Fig. 6.

The circuit in which the windings of the electro-magnet 54 are included, is provided with a contact mechanism having terminals 86 and 87 rigidly mounted in the insulating block 88. The terminal 86 is provided with the contact 89 and the terminal 87 is made of suitable spring material so that it is normally separated from the contact 89 but may be brought into connection therewith when the arm 81 is moved to the right as shown in Fig. 6. It is evident, therefore, that when the register 66 is decumulated and all of the indicating wheels are at 0, the arm 81 is moved to the left as shown in Fig. 6 and the circuit, in which the electro-magnet 54 is included, is automatically broken.

Turning now to a description of the printing mechanism as illustrated in Figs. 8 and 9, 91 and 92 are two electromagnets, the windings of which are connected in a suitable circuit. The number of these electromagnets and the mechanism which is actuated by them corresponds to the number of indicating registers the readings of which it is desired to transfer to a permanent record. Associated with the cores 93 and 94 of the electromagnets 91 and 92, are the armatures 95 and 96 pivotally connected by means of the brackets 97 and 98 with the supporting frame work 99 which is rigidly mounted on the base 100. The movement of the armatures 95 and 96 are controlled by the detents 101 and 102. Pivoted to the free end of each armature is a bell crank 103. Attached to the end of one arm of these bell cranks are the springs 104, the other end of which is rigidly attached to the pin 105. The printing registers 106 are similar to the indicating registers which have been described above, consisting of a plurality of wheels 107 associated with which are the gears 108 and the cams 109. Coöperating with the gears 108 and the cams 109 are the pinions or so-called "carry-overs" 110. On the peripheries of the wheels 107 are mounted suitable type plates 111, from which permanent records can be made as will be described hereafter. The wheels 107 are loosely mounted on the shafts 112. Rigidly connected to the unit wheel of the recording register is the ratchet 113. It is now evident that when the electromagnet 91 is energized, the armature 95 is attracted as shown in Fig. 9. When the same electromagnet is deënergized, the spring 104 becomes operative and by means of the bell crank 103 and the coöperating ratchet 113, the wheel 107 is moved one space in a forward direction, the armature and associated parts assuming the positions shown in connection with the electromagnet 92 of Fig. 9. A pawl or other similar device, which for the sake of simplicity is not shown in the drawing, may be provided in order to prevent the ratchet 113 and the attached wheel from moving in a backward direction when the armature is again attracted by the electromagnet.

In the disk or wheel 107 is provided an aperture 114 in which the pawl 115 is free to operate. The pawl 115 is pivotally mounted at 116 on the disk 107, a recess 117 being provided for that purpose. Coöperating with the pawl 115 is the spring 118 which is mounted in the disk 107. In the shaft 112 is provided a groove 119 in which the pawl 115 is adapted to fit.

Each of the pinions or carry-overs 110 is pivotally mounted on the frame 120, this frame being itself pivotally mounted at 121. Pivotally mounted on the extensions 122 of the frame 120 is the link 123, the pivotal connections being made at 124. A shaft 125 is provided with a cam 126ª having a pin 126, which operates in the slot 127 provided in an extension from the link 123. Rigidly attached to shaft 125 is a knurled handle 125ª projecting from the frame work. It is now clear that when the shaft 125 is rotated the pin 126 operating in the slot 127 will move the link 123 to the right or left, as the case may be, as shown in Fig. 9. When the link 123 is moved to the right, by means of the arms 120 the pinions 110 will be carried to the left and will occupy the position shown in dotted lines in Fig. 9. Lugs 128 are mounted on the frame work of the mechanism and when the pinions 110 are moved out of mesh with the gears of the registers, these lugs operate to prevent the pinions from rotating.

Wheels or disks 107 are loosely mounted on the shafts 112. When the pinions 110 are removed from mesh with the gears attached to the disks 107, the shafts 112 may be rotated in a clock-wise direction, as shown in Fig. 9, by means of the knurled handle 129. The groove 119 extends the whole length of the shaft 112 and inasmuch as each of the disks 107 is provided with a pawl 115 with its coöperating spring 118, it is evident that as the shaft 112 is rotated in a clock-wise direction, the disks 107 will be moved with the shaft 112 as soon as the pawl 115 of each individual disk engages with the groove 119. By this means, the same numbers on the various disks will be brought into the same line and the disks may then be moved together until the zeros are placed in the desired position. In order to facilitate this operation the handle 129 is provided with a projecting pointer 130. When this pointer 130 comes opposite to the line 131 on the frame, the type of the printing register is in such position so that all of the wheels would print 0.

The printing registers which I have described are adapted to indicate both the accumulation of costs and the order number which has been mentioned in a previous part of these specifications. In connection with the printing mechanism, means are provided for printing the date. A series of disks or wheels 132 are loosely mounted on the shaft 133. Each of these disks 132 has rigidly connected to it, a gear 134. A gear 135 is rigidly attached to disks 136 which are, in turn, loosely mounted on the shaft 137. The gears 134 and 135 are the same diameter so that when the disks 132 are revolved, the disks 136 are also revolved an equal amount. On the disks 132 are provided words indicating the months, numerals indicating the days of the month, and additional numerals indicating the year. These are clearly shown in Fig. 8. On the surface of the disks 136 are provided printing plates 138 which are adapted to print the same words or numerals which appear on the disks 132 through the opening 139 of the frame 99. For example, if the legend April 8, 1908 appears on the upper part of the disks 132, the printing plates bearing this legend will be on the lower part of disks 136. By means of the projecting teeth of the gears 134, the disks may readily be manually set as desired. In order to retain the disks in their proper positions, a flat rod 140, provided with a handle 141, is mounted in the frame work 99. This rod 140 is provided with notches 142. A pin 143 is rigidly attached to the side of the rod 140 and a spring 144 is attached to the pin 143. The other end of this spring is attached to the frame work 99. In its normal position, as shown in Fig. 8, the rod 140 locks the gears 134 in position. When the handle 141 and the rod 140 are pressed inwardly, the notches 142 are moved into position opposite the gears 134 and the disks 132 are thereby capable of being rotated as desired. When the desired positions of the disk are reached, the handle 141 is released and by means of the spring 144, the rod 141 is brought into its normal locking position.

Toward each end of the frame 99 are shafts 145 and 146 to which are attached handles 147 and 148 projecting outside of the frame work. On these shafts are rigidly mounted rollers 149 and 150 provided with flanges 151 and 152. The roller 149 is adapted to carry a roll of paper 153. As shown in Figs. 8 and 9, the paper of this roll may be carried underneath the printing mechanism and rewound on the roller 150, this operation being carried on by means of rotation of the knurled handle 148. Extending horizontally through the framework 99 is a shelf 154 provided with openings 155 in connection with each of the printing mechanisms. Directly under the printing mechanisms is a movable shelf 156 provided with brackets 157 carrying slots 158. These slots are adapted to coöperate with pins or lugs 159 which are mounted on the frame work and carry the weight of the shelf 156. Also mounted on the shelf 156 is the bracket 160 to which is pivotally attached the link 161, the other end of this link being loosely mounted on the shaft 162. The rod 163 is also loosely mounted on the same shaft 162, as well as the arm 164 of the bell crank 165 which is loosely mounted on the shaft 166. Rigidly attached to the bell crank 165 is the sleeve 167 to which is connected a crank 168. The spring 169 is rigidly attached by the pin 170 to the base 100 of the frame work and on its other end is attached to the lower arm of the bell crank 165 tending to normally keep this bell crank in position shown in Fig. 9. It is now apparent that if the sleeve 167 is rotated by the crank 168 in a contra-clockwise direction the arm 164 of the bell crank 165 will be moved upwardly and to the left. This will cause the link 161 to be moved upwardly and to the right inasmuch as movement of the shelf 156 to the left is restricted by means of the pins 159 operating in the slots 158. The rod 163 serves to connect the link 161 with other links similarly connected to the shelf 156 thus causing the shelf to rise equally in all parts. As shown in Fig. 9, a vertical wall 171 is provided to the right of the shelf 156. This serves as an abutment member as will be explained hereafter. This wall 171 is rigidly mounted in the frame 99. To the left of the shelf 156 a rigid horizontal member 172 is provided. A space is thereby left between the shelf 154 and the member 172 and the shelf 156, the portion of this space above the shelf 156 being capable of being reduced by movement of the shelf 156 in a vertical plane.

The roll of paper 153 may be provided on its under surface with carbon paper, the carbon side of which is on the lower side. When the roll of paper is passing from one roller to the other as shown in Fig. 9, it is therefore evident that if a second piece of paper is inserted beneath the paper of the roll 153, printing can be performed on this second piece of paper when the shelf 156 is raised so that the paper of the roll 153 is brought into contact with the type or printing plates mounted on the various disks of the printing registers. The printing performed on this second piece of paper is, of course, in the form of a carbon copy from the carbon paper placed underneath the paper of the roll 153. In order to facilitate the insertion of this additional piece of paper, a guide 173 is provided against the edge 174 of which the edge of the paper is adapted to abut. The edge 174 is made continuous with the left hand edge of the member 171 described above.

Having now described in detail the mechanism used in connection with my invention, I will next proceed to describe the operation of the system as a whole. This system is diagrammatically shown in Fig. 1. A battery 175 is provided, to one terminal of which is attached a conductor 176. This conductor leads to one terminal of the switch 177, to the other terminal of which is attached the conductor 178 in contact with the shaft 179. On this shaft 179 is rigidly mounted a member 180 which is adapted to make electrical contact with the ring 181. This ring is provided at intervals in its periphery with insulating segments 182 so that the various conducting segments of the ring are entirely insulated from each other. As shown in Fig. 1, these conducting segments 183, 184 and 185 are three in number. To the segment 183 is attached a conductor 184' terminating in a plug 185'. Similarly the conductor 186 with its plug 187 is attached to the conducting segment 184 and the conductor 188 with its plug 189 is attached to the conducting segment 185.

In Fig. 1, I have shown the above mentioned method of generating electric impulses but have not described in detail apparatus for imparting various rates to the impulses as mechanism for accomplishing this result has been shown in said copending application Serial No. 437,809, and forms no part of this present application. My object is merely to show means by which impulses may be produced without reference to the rate of such impulses. Associated with the plug 185' are the jacks 190, 191 and 192. To a contact of the jack 190 is attached a conductor 193 which leads to the windings of one of the electromagnets of the actuating mechanism associated with the register T 1. From this electromagnet the current passes through the conductor 194 to the windings of one of the electromagnets associated with the register X 1. Next the current passes through the conductor 195 to the point 196. The current continues through the conductor 197 to the point 198 and through the conductor 199 to the windings of one of the electromagnets of the actuating mechanism of the register X T. It then passes through the conductor 200 to the point 201, then through the conductor 202 to the windings of one of the electromagnets of the actuating mechanism of the register G T, and then through the conductor 203 back to the second pole of the battery 175 thereby completing the circuit. Similarly when the plug 185' is inserted in the jack 191, the current may be traced from the conductor 184' through the plug 185' and the contact of the jack 191, then through the conductor 204 to the winding of one electromagnet associated with the register T 2. The current next passes through the conductor 205 to the electromagnet associated with the register X 2, next through the conductor 206 to the point 196, then through the conductors 197 and 199 to the electromagnet associated with the register X T, through the conductors 200 and 202 to the electromagnet associated with the register G T and then through the conductor 203 to the pole of the battery 175.

If the plug 185' is inserted in the jack 192, the current may be traced from the conductor 184' through the conductor 207 to the electromagnet associated with the register T 3 through the conductor 208 to one of the electromagnets associated with the register X 3, then through the conductor 209 to the point 198 and then through the conductor 199 to one of the electromagnets associated with the register X T, then through the conductors 200 and 202 to one of the electromagnets associated with the register G T and then through the conductor 203 to the pole of the battery 175.

If the plug 187 is inserted in any one of the jacks 210, 211 or 212 the circuit may be traced through one winding of the actuating mechanisms associated with the registers T 1, T 2 and T 3 respectively and through the windings of one electromagnet associated with the actuating mechanism of the registers B 1, B 2, and B 3. Again if the plug 189 is inserted in the jack 213, 214 or 215 the circuit may be similarly traced through the winding of one of the electromagnets of the actuating mechanism of the registers T 1, T 2 or T 3 respectively and through the windings of one electromagnet of the actuating mechanism associated with the registers A 1, A 2, or A 3 respectively. In every case it will be seen that the circuit is so constructed that if a register A 1, A 2, or A 3 is included in the circuit, the actuating mechanism of the register A T is also so included, the same being true of the register B T with respect to the registers B 1, B 2 and B 3; X T with respect to the registers X 1, X 2 and X 3; and G T with respect to the registers T 1, T 2 and T 3.

It is now apparent from the above description that according to the system represented in Fig. 1, we may represent three jobs, job 1 having associated with it the registers A 1, and B 1, these registers representing respectively the total wages or the total wages and burden charges in department A and department B respectively. Register X 1 may represent any desired item of expense, for example, material. It is evident that inasmuch as the conductors of the circuits, in which each of the registers A 1, B 1 and X 1 are included, also include the electromagnet of the actuating mechanism of the register T 1, the actuations of this register will represent the total actuations of the register A 1, B 1 and X 1. Similarly, the register T 2 represents the total actuations of the registers A 2, B 2 and X 2, all of these registers being associated with job 2. In the same way, the actuations of the register T 3 represent the total actuations of the registers A 3, B 3 and X 3.

From the description of the circuits it has been noted that the register A T is included in series in the same circuit in which the registers A 1, A 2 and A 3 are included, the latter being connected in multiple with respect to each other. It is, therefore, evident that the actuations of the register A T will represent the total actuations of the registers A 1, A 2 and A 3. Similarly the register B T is actuated at a rate corresponding to the total actuations of the registers B 1, B 2 and B 3. X T is actuated at a rate corresponding to the total actuations of the registers X 1, X 2 and X 3 and the actuations of G T correspond to the total actuations of the registers T 1, T 2 and T 3.

In connection with the printing feature of my invention, a battery 216 is provided, to one pole of which is attached the conductor 217 leading to one terminal of the switch 218. To the other terminal of this switch is connected the conductor 219. To this conductor are connected conductors 220, 221, 222 and 223. Each of the conductors 220, 221, 222, 223 and the end of 219 terminates in a brush, these brushes bearing on the disks 224, 225, 226, 227 and 228 respectively which are rigidly mounted on the shaft 229. Between each disk is provided an insulating section 230. Each of these disks has an insulated segment 231 covering most of the periphery of the disk but leaving a conducting segment 232 with which the above mentioned brushes are adapted to make contact.

The portions of the shaft 229 immediately adjacent to the disks are electrically connected with the conducting portions of the disks. To the portion of the shaft connected with the disk 224, the conductor 233 is electrically connected. A current on passing through this conductor goes to the winding of an electromagnet associated with the printing mechanism illustrated in Figs. 8 and 9. The purpose of this electromagnet will be described in detail hereafter. The current then passes through the conductor 234 to a second electromagnet whose function is the same as that which has just been described. The current next passes through the conductor 235 to the plug 236 which is mounted in the insulating frame 237.

A spring contact 238 is associated with a jack into which the plug 237 is adapted to be placed. To the spring contact 238 is attached the conductor 239 through which the current passes to the electromagnet associated with the register N 1, the purpose of this register being to manually set up an order number which order number may be transferred to the printing mechanism as will be described hereafter. The order number register N 1 and its associated decumulating mechanism are as represented in Figs. 6 and 7. From this point the current passes through the conductor 240 to the second pole of the battery 216 thereby completing the circuit. From the shaft associated with the disk 225 the current may be similarly traced through the windings of the decumulating electromagnet associated with the register A 1 and then through the windings of the decumulating electromagnet associated with register A T, which is connected in series with the windings of the decumulating electromagnets associated with the register A 1, A 2 and A 3. The current then reaches the conductor 240 and returns to the second pole of the battery 216, thereby completing the circuit. Similarly the circuits associated with the disks 226, 227 and 228 may be traced through the windings of the decumulating electromagnets associated with the registers B 1, X 1, and T 1 and the registers B T, X T and G T, which are connected in series therewith. Similarly if the plugs mounted in the insulating frame 237 are inserted in the jacks associated with the registers N 2, A 2, B 2, X 2 and T 2, the circuits may be similarly traced through the windings of the decumulating electromagnets associated with these registers. The same is true if the plugs are inserted in the jacks associated with the registers N 3, A 3, B 3, X 3 and T 3.

The operation of my system will now be understood. When an order comes to a factory it may be given an order number. Besides this, in many cases it is desirable also to give this order a job number. The significance of the job number is that the various sets of registers, as illustrated in Fig. 1, are permanently given numbers. For example, the registers N 1, A 1, B 1, X 1 and T 1 are considered as associated with job 1; N 2, A 2, B 2, X 2 and T 2 as associated with job 2, etc. In other words, the job number merely indicates the series of registers on which it is most convenient to keep an account of the cost. The order number, on the other hand, is the number which is permanently associated with the order and by which a permanent record of the cost is identified.

In Fig. 10, an order is represented as it is originally made out in the factory: the various items in regard to invoicing, shipping instruction, etc., appear as usual together with the number and character of the articles which have been ordered. There may also be provided on this order blank a space for the job number, that is the series of registers on which an account of the cost will be kept. The clerk, whose duty it is to do this work, preferably sees what series of registers are not in operation and assigns the order to one of these series. As shown in Fig. 10, this series or job number is assumed to be 3. A way-bill may be attached to the actual work when it is started and this way-bill, on which is written the job number, may follow the work through the entire series of operations in the factory. As soon as the clerk decides what series of registers may be used to keep account of the cost of any particular order, he immediately manually sets up the order number in the order number register connected with this series. Let us now assume that the work is started and the registers in connection with a given job are being actuated. In order to accomplish this result, it is evident that the switch 177 of Fig. 1 must be closed, and the plugs associated with the various registers of the job must be inserted in their respective jacks, also the switch 218 must be open or the plugs, by means of which the decumulating circuit is closed, must be withdrawn from the jacks associated with the registers of that particular job. Let us now assume that the job is finished. The plugs associated with the circuits controlling the various registers of the job are withdrawn from their respective jacks, or if it is desired to stop all of the registers associated with the various jobs, the switch 177 may be opened. It is now possible to transfer the readings of all of the registers of a given job to the printing mechanism and then make a permanent record of these readings. This result is accomplished in the following manner: When the actuations of the registers are stopped, the switch 218 is closed and the various plugs are inserted in the jacks connected with the windings of the various decumulating electromagnets associated with the registers of a given job. The decumulating mechanisms associated with the various registers, except the order number register, are as represented in Figs. 2, 3, 4 and 5 and the mechanism associated with the order number register is as shown in Figs. 6 and 7. It is now apparent that with each revolution of the shaft 229, each of the registers associated with a particular job will be decumulated one step. At the same time the corresponding printing registers, as indicated in Figs. 8 and 9, will accumulate the same amount. When any of the registers associated with the job reaches 0, the automatic device, which has been described in detail above, becomes effective and the circuit is broken thereby stopping the further actuation of the printing register. This action proceeds until all of the registers associated with the job have been decumulated to 0 and the printing registers have accumulated so that they give the same readings which the job registers indicated before they were decumulated. A permanent record may now be made as described in connection with the printing mechanisms shown in Figs. 8 and 9. At the same time underneath the roll of paper the original order blank may be inserted, this blank being provided with a suitable space, as shown in Fig. 10, in which the printed record may be made. In this way the actual cost is shown on the original order. When the permanent record has been made, the printing registers may be manually reset to 0 as explained in connection with the description of Figs. 8 and 9, a new order number may be assigned to the same series of registers and the whole operation may be repeated.

It is desirable that not only a permanent record should be made of individual orders, but also that a similar record should be taken which will show the total expenses in connection with all orders which have been executed in a factory within a given period of time. In order to accomplish this result, I provide two duplicate sets of printing registers which are connected in series as shown in Fig. 1. The two rolls of paper 241 and 242 are used in connection with these two sets of printing registers. After the records for each order have been made, the register associated with the roll 241 may be returned to 0 as explained above. The registers associated with roll 242, however, are not returned to 0, but are allowed to accumulate. For example, if the record printed on the roll 241 showed the total expense of $16.52, the record printed on the roll 242 provided this was the first order, would show the same amount. The registers in connection with the roll 241 are set back to 0, and the record of the new order may be made, which we will assume is $20.48 which amount is printed as a total after the completion of the order. The registers in connection with roll 242, not being set back on the completion of the first order, will, at the completion of the second order, show a record of $37.00. It is obvious that by using this system a daily record may be taken which will show the total costs in connection with executed orders from any given time to the time when the record is taken. If desired, the register in connection with the roll 242 may be reset to 0 at predetermined intervals as, for example, once a month. It is also very desirable that the management should be kept posted on the net expenses incurred in connection with unexecuted orders going through the factory. It is evident that this information is constantly available in connection with registers A T, B T, X T and G T as shown in Fig. 1. The total actuations of the various registers in connection with jobs 1, 2, and 3 are shown in this latter series of registers and when the registers of any given series are decumulated and the printing registers are correspondingly actuated in a forward direction, the registers A T, D T, X T and G T are decumulated the same amount. In this way it is evident that there is always a record on these registers showing the total net costs of unexecuted orders. It is obvious that printing registers may readily be associated with this series of registers so that a daily record may be made of these net expenses. Such a record would be very useful in connection with judging the efficiency of the management of a mill, as the expenses in connection with unexecuted orders should, of course, be kept at the minimum.

It is evident that many minor changes could be made in the detailed construction which I have shown without departing from the spirit of my invention.

What I claim as new and desire to cover by United States Letters Patent is:

1. In an accounting system, an indicating register, an electromagnetically actuated decumulating mechanism associated with said register, a printing register, an electromagnetically actuated accumulating mechanism for said printing register, and means for including said mechanisms in the same electric circuit, thereby decumulating said indicating register and accumulating said printing register.

2. In an accounting system, an indicating register, an electromagnetically actuated decumulating mechanism associated with said register, a printing register, an electromagnetically actuated accumulating mechanism for said printing register, means for including said mechanisms in the same electric circuit, thereby decumulating said indicating register and accumulating said printing register, and means for automatically breaking said circuit when said indicating register is decumulated to a predetermined amount.

3. In an accounting system, an indicating register, an electromagnetically actuated decumulating mechanism associated with said register, a printing register, an electromagnetically actuated accumulating mechanism for said printing register, means for including said mechanisms in the same electric circuit, thereby decumulating said indicating register and accumulating said printing register, and means for automatically breaking said circuit when said indicating register is decumulated to zero.

4. In an accounting system, an indicating register, an electromagnetically actuated decumulating mechanism associated with said register, a printing register, an electromagnetically actuated accumulating mechanism for said printing register, means for including said mechanisms in the same electric circuit, thereby decumulating said indicating register and accumulating said printing register, and means for producing a record from said printing mechanism.

5. In an accounting system, an indicating register, an electromagnetically actuated decumulating mechanism associated with said register, a printing register, an electromagnetically actuated accumulating mechanism for said printing register, means for including said mechanisms in the same electric circuit, thereby decumulating said indicating register and accumulating said printing register, and means for bringing a recording sheet into contact with said printing registers.

6. In an accounting system, the combination of an order number register having a plurality of numeral wheels, a rotatable carry-over mechanism associated with said wheels, means for removing said carry-over mechanism from engagement with said wheels, means for securing said carry-over mechanism in its engaged or disengaged position, and means for preventing the rotation of said carry-over mechanism when it is disengaged from said wheels.

7. In combination, an accounting register, electromagnetic decumulating mechanism for said register, and electric contacts operated by said register when decumulated a predetermined amount to interrupt control of said mechanism.

8. In combination, an accounting register, electromagnetic decumulating mechanism for said register, and electric contacts operated by said register when decumulated to zero to interrupt control of said mechanism.

9. In combination, an accounting register, electromagnetic decumulating mechanism for said register, and electric contacts operated by said register when decumulated to zero to interrupt control of said mechanism until the register is again moved from its zero reading.

10. In combination, an accounting register, electromagnetic decumulating mechanism for said register, and electric contacts operated by said register when decumulated to break the circuit including said mechanism.

11. In combination, an accounting register, electromagnetic decumulating mechanism for said register, and electric contacts operated by said register when decumulated to zero to break the circuit including said mechanism, until the register is again moved from its zero reading.

12. In combination, an accounting register, an electromagnetic decumulating device associated with said register, a series of depressions in the indicating wheels of each register, a member adapted to engage in said depressions when all of said depressions are in a predetermined position and in the operating path of said member, a switch for opening and closing the circuit in which said electromagnetic mechanism is included, and means actuated by said member for opening said switch when said member engages in said depressions.

13. In combination, an accounting register, an electromagnetic decumulating device associated with said register, a switch for opening and closing the circuit in which said electromagnetic mechanism is included, said switch having spring blades normally separated from each other, a series of depressions in the indicating wheels of said register, a member adapted to engage in said depressions when all of said depressions are in a predetermined position and in the operating path of said member, an extension for said member, said extension bearing against one of said switch blades and holding the two blades in contact while said member is prevented from engaging in said depressions by the peripheries of the indicating wheels, said switch blade adapted to force the said member into said depressions when the depressions occupy a predetermined position.

14. In combination, an accounting register, an electromagnetic decumulating device associated with said register, a switch for opening and closing the circuit in which said electromagnetic mechanism is included, said switch having spring blades normally separated from each other, a series of depressions in the indicating wheels of said register, a member adapted to engage in said depressions when all of said depressions are in a predetermined position and in the operating path of said member, an insulating extension for said member, said extension bearing against one of said switch blades and holding the two blades in contact while said member is prevented from engaging in said depressions by the peripheries of the indicating wheels, said switch blades adapted to force the said member into said depressions when the depressions occupy a predetermined position.

15. In a printing device, the combination of a printing register, an actuating mechanism for said register, a carry-over mechanism for the wheels of said register, means for disengaging said carry-over mechanism from said wheels, and means for resetting said register to a predetermined amount.

16. In an accounting system, the combination of two series of corresponding registers, mechanism for concurrently actuating each of the pair of corresponding registers, and means for independently decumulating each register of said pairs.

17. In an accounting system, the combination of two series of corresponding printing registers, an electromagnetic actuating device associated with each of said registers, means for electromagnetically connecting the actuating mechanisms of the corresponding registers of the two series, said corresponding registers thereby adapted to be actuated simultaneously, and means for independently decumulating each of said registers.

18. In an accounting system, the combination of two series of corresponding printing registers, an electromagnetic actuating device associated with each of said registers, means for electrically connecting in series the actuating mechanisms of the corresponding registers of the two series, said corresponding registers thereby adapted to be actuated simultaneously, and means for independently decumulating each of said registers.

19. In an accounting system, the combination of a plurality of series of corresponding registers, each series adapted to indicate the costs of a single order, an accumulating actuating mechanism associated with each of said registers, a series of registers for totalizing the actuations of the corresponding registers of the various series, an accumulating actuating mechanism associated with each of said totalizing registers, means for summating the actuations of all corresponding registers in the totalizing registers, means for decumulating any of said series of registers on the completion of an order, and means for automatically decumulating the corresponding totalizing registers the same amount, said totalizing registers thereby adapted to indicate the net costs of unfinished orders.

20. In an accounting system, the combination of a plurality of series of corresponding registers, each series adapted to indicate the costs of a single order, an electromagnetic accumulating actuating mechanism associated with each of said registers, a series of registers for totalizing the actuation of the corresponding registers of the various series, an electromagnetic accumulating actuating mechanism associated with each of said totalizing registers, means for summating the actuations of all the corresponding registers in the totalizing registers, electromagnetic means for decumulating any of said series of registers on the completion of an order, and electromagnetic means for automatically decumulating the corresponding totalizing registers the same amount, said totalizing registers thereby adapted to indicate the net cost of unfinished orders.

In witness whereof, I hereunto subscribe my name this 18th day of May, A. D. 1909.

CHARLES H. TALLMADGE.

Witnesses:
FRED O. HEUSER,
HENRY M. HUXLEY.